United States Patent

Merrill et al.

[11] 3,930,605
[45] Jan. 6, 1976

[54] METHOD OF FABRICATING A CONFORMABLE SANDWICH STRUCTURE

[75] Inventors: Peter S. Merrill, San Diego; Richard S. Mueller, Lakeside, both of Calif.

[73] Assignee: International Harvester Company, San Diego, Calif.

[22] Filed: Aug. 6, 1973

[21] Appl. No.: 386,141

[52] U.S. Cl............................ 228/190; 29/455 LM
[51] Int. Cl.² ........................................ B23K 31/02
[58] Field of Search............ 29/471.3, 472.3, 471.7, 29/497.5, 475, 500, 522, 525, 455 LM

[56] References Cited
UNITED STATES PATENTS

| | | | |
|---|---|---|---|
| 2,700,632 | 1/1955 | Ackerland | 29/455 LM |
| 2,988,809 | 6/1961 | Hall | 29/455 LM |
| 3,300,839 | 1/1967 | Lichti | 29/475 |
| 3,373,480 | 3/1968 | Fuchs | 29/455 LM |

*Primary Examiner*—Al Lawrence Smith
*Assistant Examiner*—Margaret Joyce
*Attorney, Agent, or Firm*—Matthew P. Lynch

[57] ABSTRACT

A method of fabricating a sandwich structure consisting of a compliant sheet and a rigid sheet, the sheets being separated by a core. The compliant sheet is adapted to conform to the shape of the rigid sheet and the irregularities of the core through the utilization of the compliant sheet as an integral part of the tooling to provide a self-contained vacuum bag, wherein the compliant sheet is caused to be formed into intimate contact with the core.

3 Claims, 9 Drawing Figures

U.S. Patent  Jan. 6, 1976  Sheet 1 of 2  3,930,605
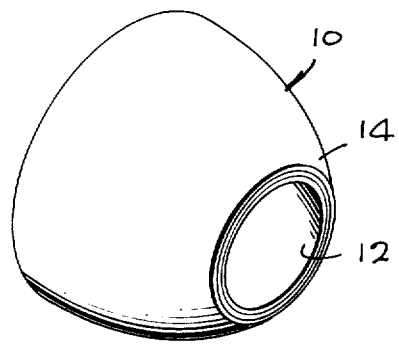
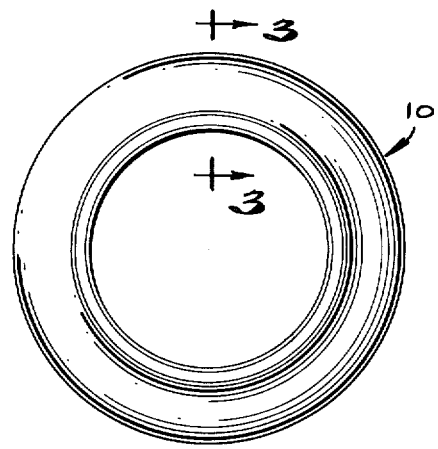
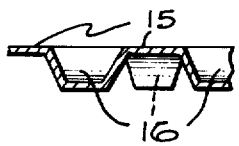
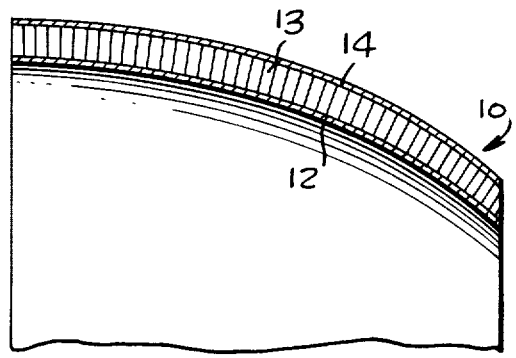
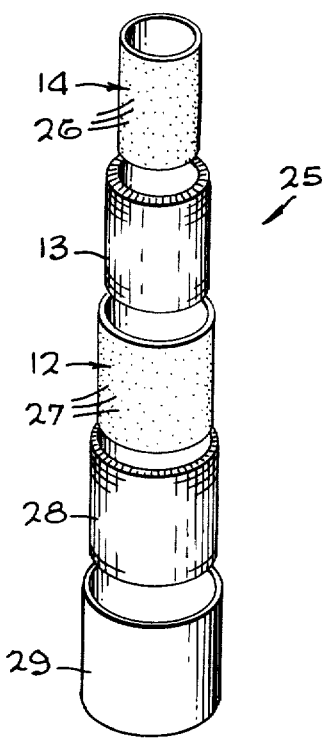
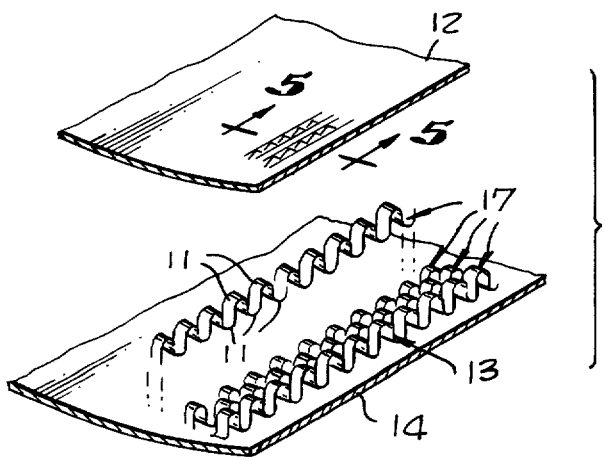

METHOD OF FABRICATING A CONFORMABLE SANDWICH STRUCTURE

BACKGROUND OF THE INVENTION

To protect aircraft from infrared radiation (IR) seeking missiles, it is necessary to shield those portions of the aircraft's engines which get hot enough to emit infrared radiation. It has been determined that the most effective type of IR suppressor is of the sandwich type construction consisting of a hot surface, a cooling core and a cold surface. Since the IR suppressor has to effectively shield compound structures without significantly increasing the weight of the aircraft, it is extremely important that the suppressor be of light weight and capable of being produced in compound curvature shapes.

Over the last few years a number of major advancements have been made in the construction of light weight compound curvature suppressors; however, the advanced construction techniques are prohibitively expensive and the suppressors constructed thereby are usually structurally unreliable and not thermally accommodating. The most common technique currently being utilized is to machine or fabricate, utilizing highly sophisticated machines and expensive dies, complementary hot and cold plates or sheets of identical shape with one of the plates having reduced dimensions, thereby allowing the smaller plate to serve as the inner face of a compound curvature sandwich.

The complementary plates must match perfectly in order to enable a structurally sound bond to be achieved between the plates and the core which is usually of a honeycomb or corrugated construction. After the precisely matched plates have been formed the core must be machined to fit between the plates. As is well known, honeycomb or corrugated core is extremely difficult to machine to precise tolerances and this is what causes most of the problems. Since honeycomb or corrugated cores are somewhat flexible, they can be deformed to abut the inner surface of the outer plate or sheet to which it is bonded; however, due to the tolerance variations in the core when the inner plate is placed in position only a portion of the core will come into contact with the rigid inner plate, thereby preventing a complete structurally sound bond between the core and the inner plate. Since both the inner and outer plates are rigid there is no economically feasible method of obtaining a structurally sound bond between the inner and outer plates and the core and, therefore, the rejection rate of compound curvature infrared suppressors is extremely high.

An additional problem which is particularly acute in an aircraft environment is the differential temperature on the hot and cold, inner and outer plates of the suppressor; for example, the hot inner side of the suppressor may be exposed to temperatures as high as 1800° F. while the cold outer side may be exposed to ambient or external temperatures as low as minus 120° F. This thermal gradient creates great stress within the structure, thereby producing fractures or weld breaks and braze separations between the core and the face plates, while a small degree of braze separations would normally be acceptable, when combined with a structurally poor initial bond it may prove disastrous.

In addition to compound curvature infrared suppressors, there is also a need for compound curvature sound suppressors. Over the last few years the general public and various government agencies have become extremely interested in reducing the amount of noise emanating from various types of power plants but particularly from aircraft engines. Mufflers have been developed which effectively reduce the noise of automobile engines but such mufflers are not suitable for aircraft engines. The same construction techniques that are utilized to produce compound sandwich structure for infrared suppressors can also be used for sound suppressors since the same problems need to be overcome both with regard to compound shapes and thermal gradients. Additionally, sound suppressors can be structurally damaged by vibration due to sound which, in conjunction with the damage caused by the thermal gradient causes the structure to have a very limited useful life.

SUMMARY OF THE INVENTION

The present invention overcomes all of the aforementioned problems by providing a compound curvature suppressor which does not require precisely matched inner and outer sheets and which compensates for tolerance variances in the core. Additionally, the improved suppressor of the present invention is capable of compensating for extreme differential temperatures and vibration, thereby reducing fractures and bond breaks. The present invention eliminates the aforementioned objectionable features of prior art suppressors by providing a compliant sheet which is adapted to yield and conform to the core regardless of its dimensional inaccuracies. The compliant sheet is roughly fabricated to approximately the correct dimensions without regard to tolerances and then forced by any well known means into abutment with the core along its entire surface, thereby allowing a structurally sound bond to be achieved regardless of the tolerance variations in the core.

The compliant sheet can also be utilized as an integral part of the tooling required to form the compliant sheet by providing a self-bagging vacuum bag in conjunction with a mandrel.

BRIEF DESCRIPTION OF THE DRAWINGS

FIG. 1 is a perspective view of a compound curvature structure constructed in accordance with this invention;

FIG. 2 is a front view of FIG. 1;

FIG. 3 is a view along section 3—3 of FIG. 2;

FIG. 4 is an exploded perspective of the sandwich structure of the infrared suppressor of the present invention;

FIG. 5 is a view along section 5—5 of FIG. 4;

FIG. 6 is an exploded perspective of the sandwich structure of the sound suppressor of the present invention;

DESCRIPTION OF THE PREFERRED EMBODIMENT

Figure 8:
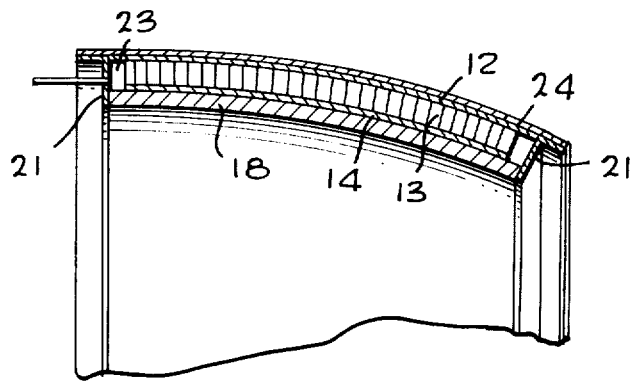
FIG. 8 is a cut-away of another embodiment of the tooling for constructing a compound curvature structure.

Referring now to the drawings, wherein like reference numbers designate like or corresponding parts throughout the several views, there is shown in FIGS. 1 and 2 an example of a sandwich structure 10 having a compound curvature for use in suppressing infrared radiating surfaces. The structure 10, while being shown as a truncated cone for the sake of simplicity of illustration can be formed in any number of compound curved shapes.

FIG. 3 shows a partial cut-away of FIG. 2 and illustrates in enlarged cross-section the sandwich structure of the suppressor. The sandwich structure 10 of FIGS. 1, 2 and 3 consists of a compliant inner sheet 12, a core 13 and a rigid outer sheet 14. The compliant sheet 12 is shown in detail in FIGS. 4 and 3, wherein it can be seen that the sheet 12 has an irregular cross-grained surface of either a gnarled or serriform-like appearance, providing spaced apart ridges 15 alternatively visible from opposite sides of the sheet. The ridges 15 are not necessarily symmetrical and are separated by irregular indentations 16.

While the particular surface pattern of the compliant sheet 12, as illustrated, is sufficient for the purpose of allowing the sheet to conform to irregular shapes, it is by no means the only pattern that would be acceptable. Various patterns can be formed which will allow the sheet to be compliant or yielding in various directions, depending upon the pattern. Additionally, the irregular surface of the compliant sheet provides a greatly increased surface area which enables the sheet to vary its outer dimensions in response to thermal gradiants and vibration and dissipate heat to a much greater extent than a smooth rigid sheet.

While the core 13 has been designated in some cases as being constructed from honeycomb, the term honeycomb has been used in its broadest sense to mean having a plurality of cells or inter-connected passages or cavities running in various directions, such as would be found in corrugated materials.

In the preferred embodiment of the infrared suppressor, as shown in FIG. 4, the core 13 which is a thermally accomodating structure basically consists of a plurality of strips of metal 17 having a substantially continuous sine wave or corrugated configuration. The strips 17 are secured to the rigid sheet 17 by brazing or welding so that the unsecured or opposite arcs 11 of the sine waves of the strip 17, which form the corrugated configuration are perpendicular to the sheet 14. The strips 17 are placed in parallel slightly offset juxaposition to each other so that when all the strips 17 have been secured to the sheet 14, the strips substantially cover one entire face of the sheet.

The sheet 14 can be formed or machined into the desired configuration, whereby it provides a rigid sheet of metal having the desired contours to encompass the member to be shielded. On occasion it has been determined that in order to save weight and allow air to circulate between the strips 17 the purpose of cooling and equalizing temperature, the sheet 14 can be provided with a plurality of perforations (not shown) but even with the perforations, the sheet 14 remains substantially rigid.

In forming the basic sandwich structure 10, the sheet 14 is formed to the configuration desired and then the strips 17 are secured in rows to one face of the sheet 14 until the face is substantially covered by the individual strips, alternatively the plurality of strips 17 can be replaced by a single sheet consisting of a plurality of strips joined together. Then the compliant sheet 12 is generally shaped to the same configuration as the rigid sheet 14 and placed into juxaposition thereto and pressure is exerted against the compliant sheet 12, causing it to deform into abutting complementary relationship to the free arcs 11 of the strips 17 which form the core 13. After the compliant sheet 12 has been deformed into complementary relationships, the entire sandwich structure 10 is loaded with braze alloy and placed into an atmospherically controlled retort, wherein the entire sandwich structure is brazed together, thereby forming a thermally accomodating sandwich structure 10, having no significant bond voids between the core 13 and the sheets 12 and 14.

An alternate embodiment of the present invention is shown in FIG. 6, which illustrates an exploded perspective of the sound suppressor constructed in accordance with the present invention. The sound suppressor 25 consists of a rigid inner face sheet 14 having a plurality of perforations 26. The rigid sheet 14 of the suppressor 25 is similar in construction to the face sheet 14 of the sandwich structure 10. Disposed about the sheet 14 is a cellular or honeycomb core 13 and disposed about the core 13 is a compliant sheet 12, which also has a plurality of perforations 27. The only difference between the sound suppressor 25 and the sandwich structure 10 at this stage of its construction is the perforations 26 and 27 in the rigid sheet 14 and the compliant sheet 12, respectively. Overlying the perforated compliant sheet 12 is another tubular section of cellular or honeycomb core 28 and overlying the core 28 is another compliant sheet 29 which is not perforated.

When in utilization the sound emitted by the member to be suppressed travels through the perforations in the sheet 14 into the cells of the core 13 where the sound is partially absorbed by the core 13 and the remainder passes through the perforations in the compliant sheet 12 into the cells of the second core 28 where it is further absorbed and contained.

Figure 7:
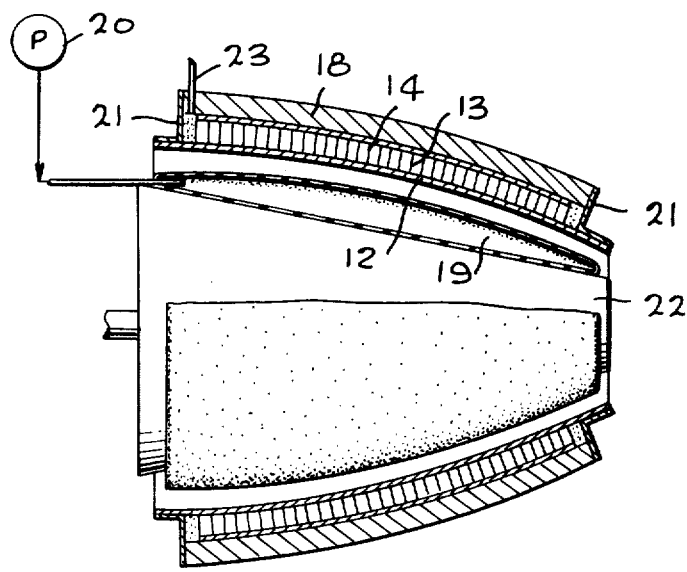
FIG. 7 is a cut-away of one embodiment of the tooling for constructing the compound sandwich structure.
Figure 9:
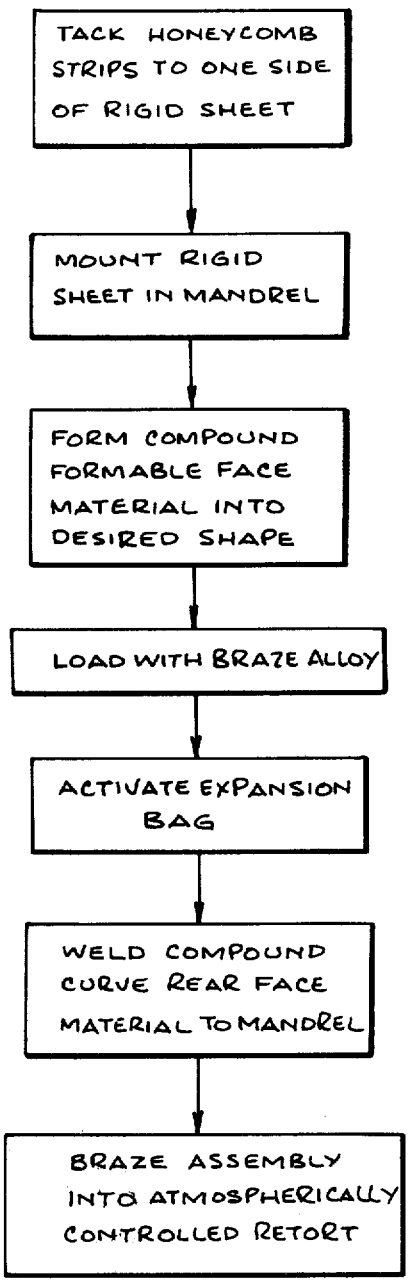
FIG. 9 is a flow diagram of the steps in constructing the compound sandwich structure.

FIG. 7 shows one embodiment of the tooling for forming the structure 10 or the sound suppressor 25, wherein the compliant sheet 12 is disposed internally of the rigid sheet 14 and the compliant sheet 12 has not been perforated.

In assembly the rigid sheet 14 is formed to shape in any well known manner and a corrugated or honeycomb core 13 is welded or brazed to the inner face of the sheet 14 so that the core 13 substantially covers the entire inner surface of the sheet 14. The rigid sheet 14 with the core 13 secured thereto is then placed against a mandrel 18. FIG. 7 shows a cut-away of the mandrel 18 containing the compound sandwich structure 10 prior to bonding. The sheet 14 in this instance is generally of a truncated conical shape for the sake of simplicity of illustration. The compliant sheet 12 is formed generally into a similar conical shape having dimensions less than the internal dimensions of the combined sheet 14 and core 13. After forming the compliant sheet 12 into a truncated cone the free edges are welded together to provide some rigidity and the assembled cone is slipped into the sheet 14 in juxaposition to the free ends or arcs 11 of the core 13.

A support structure 22 is then inserted within the conical compliant sheet 12, the purpose of the structure 22 is to provide a support for a pressure bag 19 which is inserted between the compliant sheet 12 and the structure 22. The pressure bag 19 is connected to a source of pressure 20, which enables the bag 19 to be pressurized, thereby expanding against the compliant sheet 12 and forcing it into general conformity with the core 13. Secured to the ends of the mandrel 18 are extension members 21, which depend radially from the mandrel towards the axis thereof.

Because of the cross-grained embossed pattern of the compliant sheet 12, it has the ability to expand under pressure from the pressure bag 19 and as the pressure bag is pressurized the compliant sheet 12 expands into abutting complementary relationship with the core and the mandrel. After expanding the compliant sheet 12, the pressure bag 19 is removed and the outer free edges of the compliant sheet 12 are tack welded to the extension members 21 of the mandrel 18, thereby providing a hermetic seal between the compliant sheet 12 and the mandrel 18. The securing of the compliant sheet 12 to the mandrel 18 is an important part of the present invention because it provides for a self-contained vacuum bag. Because of the nature of the core 13, a vacuum can be applied through an opening 23 into the cavity formed by the sheet 12 and the mandrel 18 and then because of the hermetic seal between the compliant sheet 12 and the mandrel 18, the sheet 12 is drawn into complete contact with the entire free face of the core 13, to which it is desired to bond the sheet 12. The ability of the compliant sheet 12 to be an integral part of the vacuum bag eliminates the need to provide for a separate vacuum bag and thereby provides a major cost saving. Additionally, because of the flexibility of the compliant sheet 12, it is capable of being drawn into complete engagement with the core 13, thereby enabling it to be joined to the core 13 without voids or unbonded portions. The entire assembly, including the mandrel 18, rigid sheet 14, core 13 and compliant sheet 12, is then placed into an atmospherically controlled retort, where it is brazed. If desired, the vacuum within the core 13 can take place within the retort during brazing in order to provide for external pressure on the compliant sheet 12 during brazing and thereby ensure an intimate braze joint contact; however, in such a procedure care must be taken to ensure that the pressure within the retort is greater than that within the cavity formed by the mandrel and the sheet, in order that the sheet remain in contact with the core.

An alternate embodiment of the method and tooling for constructing the compound sandwich structures of the present invention is illustrated in FIG. 8, which shows the mandrel 18 disposed inwardly of the rigid sheet 14 which may be perforated if it is desired to construct a sound suppressor 25. The sheet 14 lies in juxtaposition to the outer surface of the mandrel 18 within the confines of the extension members 21. The honeycomb or corrugated core 13 is secured to the rigid sheet 14 in the same manner as hereinbefore described and the compliant sheet 12 is formed into a complementary configuration to the rigid sheet 14 with internal dimensions greater than the diameter of the sheet 14 and the core 13 combined. The formed compliant sheet 12 is then placed in overlying or sandwiched relationship to the sheet 14 and core 13; in this instance, however, the sheet 12 is not extended beyond the confines of the extension members 21 as was the case with the embodiment of FIG. 7 and additionally, the compliant sheet 12 can be perforated if desired.

After the compliant sheet 12 is in position, the core 13 is loaded with braze alloy and then a second compliant sheet 24 is formed into a complementary configuration to the compound sandwich structure and placed into overlying relationship thereto. The compliant sheet 24 is constructed in a length greater than the compliant sheet 12 so that sheet 24 extends into overlying juxtaposition to the extension members 21 to which it is then hermetically secured by welding or any other well known method. After the sheet 24 has been hermetically secured to the members 21 to form a chamber 30 a vacuum is induced in the chamber 30 through opening 23. The vacuum causes the sheet 24 to draw down against the sheet 12, thereby forcing the sheet 12 into intimate contact with the core 13 to which it will be bonded, when placed in the retort as hereinbefore described.

While the invention has herein been illustrated and described in what is considered to be the most practical and preferred embodiment, it is recognized that departures may be made therefrom within the scope of the invention, which is to be accorded the full scope of the claims so as to embrace any and all equivalent devices.

We claim:
1. A method of fabricating a sandwich structure comprising the steps of:
   forming a rigid sheet to the desired configuration;
   securing a core to one face of said rigid sheet;
   placing said rigid sheet with said core secured thereto in abutment to a mandrel;
   forming a compliant sheet to the desired configuration;
   placing said formed compliant sheet in complementary juxtaposition to said core;
   securing said compliant sheet to said mandrel to form a hermetic chamber;
   creating a vacuum between said core and said compliant sheet, whereby said sheet is caused to abut said core; and
   securing said compliant sheet to said core.

2. A method of fabricating a conformable sandwich structure comprising the steps of:
   forming a rigid sheet to the desired configuration;
   securing a flexible core to one face of said rigid sheet;
   forming a compliant sheet to the desired configuration;
   placing said formed compliant sheet in juxtaposition to said core;
   placing said rigid sheet with said flexible core secured thereto in abutment to a mandrel;
   securing the edges of said compliant sheet to said mandrel; and
   creating a vacuum between said mandrel and said compliant sheet, whereby said sheet is drawn into abutment to said core.

3. A method of fabricating a sandwich structure comprising the steps of:
   forming a rigid sheet to the desired configuration;
   securing a core to one face of said rigid sheet;
   placing said rigid sheet with said core secured thereto in abutment to a mandrel;
   forming a compliant sheet to the desired configuration;
   placing said formed compliant sheet in complementary juxtaposition to said core;
   perforating said formed compliant sheet in juxtaposition to said core;
   securing a second compliant sheet to said mandrel to form a hermetic chamber; and
   creating a vacuum between said mandrel and said second compliant sheet, whereby said second compliant sheet causes said perforated compliant sheet to abut said core.

* * * * *